Oct. 10, 1950     E. W. OETH     2,525,715
TRAILER FOR BOAT HANDLING
Filed Nov. 5, 1946
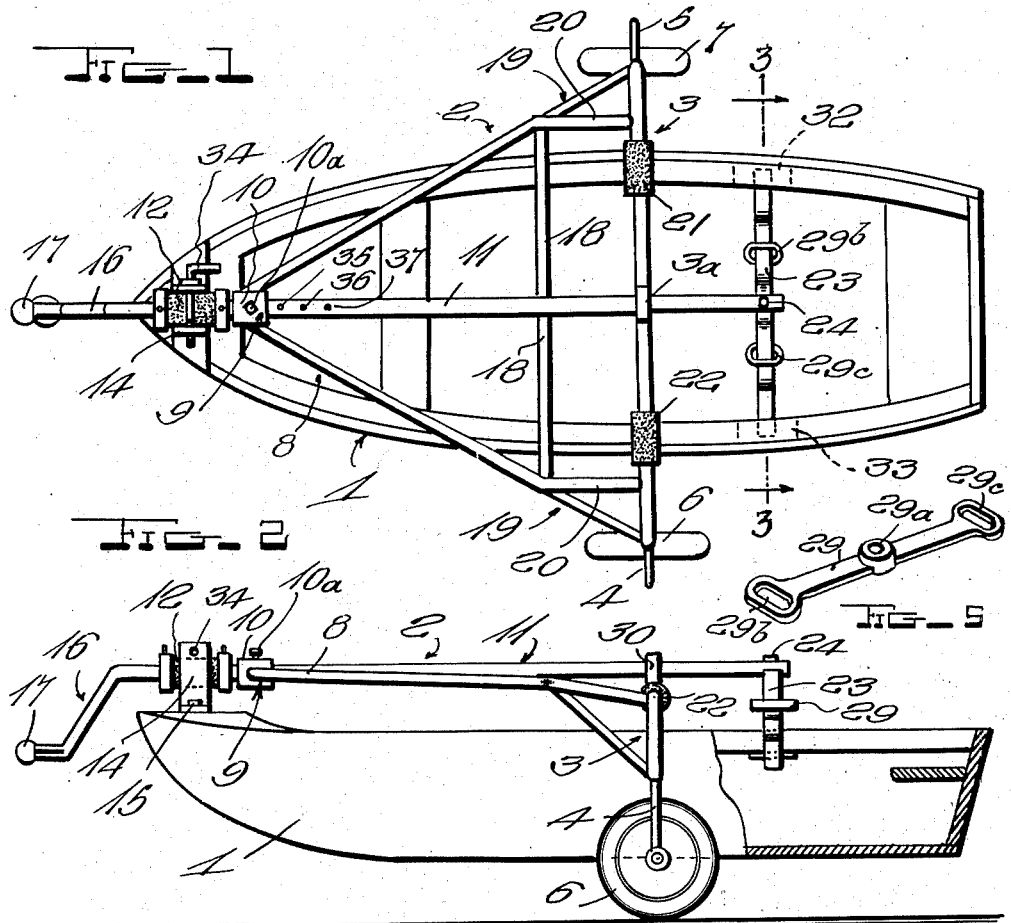
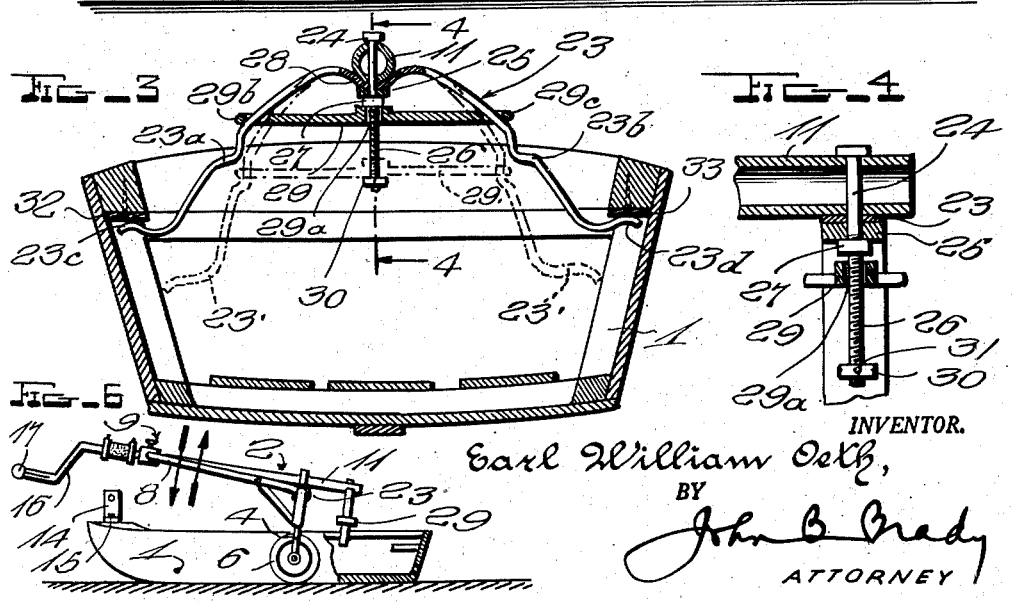
INVENTOR.
Earl William Oeth,
BY John B. Brady
ATTORNEY Patented Oct. 10, 1950

2,525,715

UNITED STATES PATENT OFFICE 2,525,715

TRAILER FOR BOAT HANDLING

Earl William Oeth, Evansville, Ind., assignor of one-third to Ruby A. Oeth, Evansville, Ind.

Application November 5, 1946, Serial No. 707,897

7 Claims. (Cl. 214—65)

My invention relates broadly to boat handling equipment and more particularly to an improved construction of trailer for attachment to a vehicle for transporting and launching boats.

One of the objects of my invention is to provide a simplified construction of trailer and boat handling means associated therewith for facilitating the transportation and launching of boats.

Another object of my invention is to provide an improved construction of suspension means for supporting a boat with respect to a trailer in such manner that the boat may be conveniently mounted for transportation by the trailer and released therefrom for launching by one individual without assistance.

Still another object of my invention is to provide a spring suspension means for detachably supporting a boat with respect to a trailer including in combination with the longitudinally extending beam of a trailer, a transversely arranged spring member operative to engage the boat adjacent opposite sides thereof for resiliently supporting the boat with minimum shock incident to transportation of the boat on the trailer over relatively rough roads.

Still another object of my invention is to provide a construction of spring suspension means for supporting the boat with respect to a trailer, including means for maintaining the spring suspension means out of engagement with the boat while the trailer is being maneuvered for launching or retrieving the boat.

Other and further objects of my invention reside in a construction of an improved shockproof mounting for suspending a boat from a trailer as set forth more fully in the specification hereinafter following by reference to the accompanying drawings, in which:

Figure 1 is a top plan view of the trailer in straddling position with a boat suspended thereby in accordance with my invention; Fig. 2 is a side elevational view partially broken away and illustrated in section and showing a boat suspended by the trailer in accordance with my invention; Fig. 3 is a transverse sectional view on a somewhat enlarged scale taken substantially on line 3—3 of Fig. 1; Fig. 4 is a vertical sectional view through the resilient suspension means and the control mechanism associated therewith, taken substantially on line 4—4 of Fig. 3; Fig. 5 is a perspective view of the control mechanism for the spring suspension means used on the trailer; and, Fig. 6 is a schematic view illustrating the manner in which the trailer and boat suspension means is utilized in picking up or launching the boat.

Referring to the drawings in detail reference character 1 designates the boat which is to be transported and/or launched. The trailer is designated at 2 comprising a saddle-like frame which straddles the boat 1. The trailer comprises a U-shaped frame 3 terminating in a pair of yoke portions 4 and 5 which embrace the wheels 6 and 7 and form journals therefor. The trailer frame 3 includes a substantially Y-shaped portion 8 which terminates in an apex portion 9 including a cylindrical sleeve member 10 through which the longitudinally extending adjustable beam 11 is adapted to slide. In alignment with the sleeve-like member 3a carried by frame 3 the longitudinally extending beam 11 is adjustable through sleeves 10 and 3a for lengthening or shortening the projection of beam 11 with respect to the substantially U-shaped frame 3 of the trailer. Thus the trailer may be adapted for transporting, launching and/or retrieving boats of differing lengths. When the proper length of beam 11 has been determined set screw 10a in sleeve 10 is engaged through the proper aperture in beam 11 which I have represented at 35, 36 and 37 in Fig. 1. The beam 11 carries an adjustable resilient sleeve member 12 thereon forming a shock absorber which is adapted to be supported in the yoke-shaped member 14 mounted adjacent the bow of the boat 1. The yoke-shaped member 14 is permanently fastened to the boat 1 by suitable securing bolts indicated at 15 and is aligned with the center line of the boat. The beam 11 is directed angularly downward as represented at 16 and terminates in a coupling portion 17 which may be attached to the vehicle used for pulling or pushing the trailer in transporting the boat over a highway or in launching or retrieving the boat.

The frame 8 is suitably reinforced by interconnecting members represented at 18, 19 and 20 for insuring rigidity of the trailer frame. The U-shaped frame portion 3 carries a pair of shock absorber resilient sleeve-like members 21 and 22 which protect the gunwales of the boat in the event that the boat tends to rock or sway or angularly shift during transporation to a sufficient extent to strike the trailer frame.

The end of the longitudinally extending beam 11 provides a support for a transversely arranged resilient leaf spring member 23 which projects in opposite directions from the longitudinally extending beam 11 in a plane substantially normal to the axis of the longitudinally extending beam 11. The spring 23 may be of flat multiple leaf spring construction or a single flat strip of tempered steel may be utilized to support and suspend the mast of the boat within the trailer frame. The spring 23 is secured adjacent the end of the longitudinally extending beam 11 by means of a bolt or pin member 24 which passes downwardly through the beam 11 and through the resilient strip 23 and the shaped securing means 25 with the depending end portion thereof screw-threaded as represented at 26.

Nut 27 is screw-threaded upon the depending screw-threaded portion 26 of the bolt or pin member 24 for securing the member 25 against spring 23 and firmly maintaining spring 23 in position adjacent the end of the longitudinally extending beam 11. The member 25 is so shaped by curvature of the face thereof that spring 23 may be curved around the under surface of the longitudinally extending beam 11 as represented at 28 and confined in substantially interlocked position with respect to the beam 11. Beam 11 is of tubular construction having a circular section around which the flat spring 23 is conformed and confined by shaped member 25 and nut 27. By reason of this construction the flat spring 23 is maintained in a plane which is substantially normal to the axis of the beam 11.

The bolt 24 has the screw-threaded depending end 26 thereof extending through the adjustable strip member 29. The strip member 29 is centrally apertured at 29a for the free passage of the screw-threaded end 26 of bolt 24. Strip 29 is provided with transversely extending apertured end portions 29b and 29c through which the ends of the leaf spring 23 are threaded in initially assembling the strip 29 with respect to spring 23.

The spring 23 has the opposite ends thereof shaped to provide instruck portions 23a and 23b into which the apertured ends 29b and 29c of strip 29 are adapted to interlock for drawing the ends of the spring 23 together in dotted line position 23' as illustrated in Fig. 3. In this position the curved ends 23c and 23d of the spring 23 are drawn together and confined in a position clearing the gunwales of the boat 1 so that the spring 23 is free to be moved into or out of the interior of the boat 1. The spring 23 when moved to the restricted position shown in dotted lines at 23' permits the trailer to be moved into position straddling the boat 1 as illustrated in Fig. 6 with the beam 11 tilted at a sufficient angle to project the confined ends 23c and 23d beneath the gunwales of the boat 1. As thus positioned the strip 29 occupies its lowermost limiting position as illustrated in dotted lines 29' in Fig. 3 by which the opposite ends of the spring 23 are drawn together. This downward movement of strip 29 is limited by abutment with the nut 30 on the depending threaded end 26 of the bolt or pin member 24. The nut 30 is confined on bolt or pin 24 when moved to the adjusted selected position by means of a set screw which enters the side of nut 30 as represented at 31 in Fig. 4.

Thus the strip 29 is free to be shifted between limits defined by nuts 27 and 30 for drawing the ends of spring 23 together or removing all restriction therefrom. When confining restrictions are removed from strip 23 as illustrated in full lines in Fig. 3 the spring 23 is free to move into engagement with the gunwales of the boat 1 as shown in the full line position in Fig. 3.

To provide for the suspension of the boat on the trailer I install in the boat hardware in addition to the yoke 14 heretofore described. That is to say, bearing plate members 32 and 33 are mounted beneath the gunwales of the boat 1 to provide wearing surfaces against which the ends 23c and 23d of the spring 23 may engage.

When the strip 29 is moved to the full line position as illustrated in Fig. 3 the ends of spring 23 are fully engaged beneath the gunwales of the boat and the beam 11 is moved downwardly as illustrated in Fig. 6 with the axis of wheels 5 and 6 as a center for engaging shock absorber 12 in the yoke 14. This operation elevates the boat from the ground. Pin member 34 is then projected through yoke 14 for confining beam 11 with respect to the boat. By then raising the coupling portion 17 of the beam 11 and establishing coupling relationship with the vehicle the trailer is ready to be transported over the highway.

When the trailer arrives at the location of launching the coupling portion 17 of the trailer may be uncoupled from the vehicle and the trailer backed down the beach and into the water. The boat 1 is then partially submerged in the water. The strip 29 is then pushed downwardly drawing the ends of spring 23 together and disengaging ends 23c and 23d from the gunwales thereby freeing the spring 23 from the boat. The trailer may now be pulled up the beach away from the boat leaving the boat free for further movement into the water.

The retrieving operation is just the reverse of the launching operation with strip member 29 in the position 29' the spring 23 is free to enter the interior of the boat as heretofore explained in connection with Fig. 6 and when the ends of spring 23 are freed by movement of strip 29 to full line position the ends 23c and 23d spring outwardly to engage beneath the gunwales of the boat.

When the beam 11 is then moved downwardly and engaged within yoke 14 the trailer is free to be moved by the vehicle which may be coupled to the coupling portion 17 of the beam 11.

It will be observed that the construction of the trailer frame is maintained as simple as possible and without the installation of shock absorbing springs. The resiliency necessary to protect the boat against damage in transportation is secured wholly by the structure of the transversely extending spring 23 assisted by such shock absorbing properties as are inherent in the resilient sleeves 12, 21 and 22. The resiliency imparted by the spring 23 is sufficient to carry the load offered by the boat 1 as well as camping and other equipment which may be carried in the boat 1.

While I have described my invention in one of its preferred embodiments I realize that modifications may be made and I intend no limitations beyond those which may be imposed by the scope of the appended claims.

What I claim and desire to secure by Letters Patent of the United States is as follows:

1. In a suspension rig, a longitudinally extending beam projecting over a load to be supported, a transversely extending spring member connected with said beam and engageable at spaced intervals with the load for resiliently suspending the load from said beam, and a slide having apertured ends embracing the transversely extending portions of said spring member, said slide being movable toward or away from said beam for displacing the ends of said spring member toward each other while said beam is being maneuvered into a position for engaging or disengaging said spring with respect to the load.

2. In a suspension rig, a longitudinally extending beam projecting over a load to be supported, a transversely extending spring member connected with said beam and engageable at spaced intervals with the load for resiliently suspending the load from said beam, a pin member extending from the connection of said spring member with said beam, a slidable bar mounted on said pin member, and means at opposite ends of said slidable bar for engaging opposite portions of said spring member, said slidable bar being adjustable on said pin member for displacing the ends of said spring member toward each other while said beam is being maneuvered into a position for engaging or disengaging said spring member with respect to said load.

3. In a suspension rig, a longitudinally extending beam projecting over a load to be supported, a transversely extending spring member connected with said beam and engageable at spaced intervals with the load for resiliently suspending the load from said beam, said spring member having an in-struck portion intermediate the point of connection of said spring member with said beam and the ends thereof, a pin depending from the point of connection of said spring member with said beam, and a bar slidable along said depending pin and having apertured ends engaging said spring member and movable into and out of the in-struck portions of said spring member for displacing the ends of said spring member toward each other while said beam is being maneuvered into a position for engaging or disengaging said spring member with said load.

4. In a suspension rig, a longitudinally extending beam projecting over a load to be supported, a transversely extending spring member connected with said beam and engageable at spaced intervals with the load for resiliently suspending the load from said beam, said spring member having transversely disposed instruck portions intermediate the connection of said spring member with said beam and each of the extremities of said spring member and a slide suspended beneath said beam and slidably engaging the opposite transverse portions of said spring member and displaceable in a vertical direction toward or away from said beam for spreading or collapsing the extremities of said spring member for engaging or disengaging the load, said slide being engageable in the instruck portions of said spring member for maintaining the extremites of said spring member in collapsed position.

5. In a suspension rig, a longitudinally extending beam projecting over a load to be supported, a transversely extending spring member connected with said beam and engageable at spaced intervals with the load for resiliently suspending the load from said beam, said spring member having transversely disposed instruck portions intermediate the connection of said spring member with said beam and each of the extremities of said spring member and a flat bar extending beneath said beam and below said spring member, said flat bar being vertically adjustable in a horizontal plane with respect to said beam and having transverse slots in the extremities thereof for the passage of opposite portions of said transversely disposed spring member whereby the extremities of said spring member may be spread or collapsed to engage or disengage the load, the transverse slots in said flat bar engaging within the instruck portions of said spring member for maintaining the extremities of said spring member in collapsed position with respect to the load.

6. In a suspension rig, a longitudinally extending beam projecting over a load to be supported, securing means on said beam for detachably engaging a load, an elongated resilient member depending from said beam at a point removed from said securing means, the end portions of said resilient member being engageable with said load at spaced points for resiliently suspending said load from said beam, and means for moving the ends of said resilient member toward and from each other to facilitate engagement and disengagement with said load.

7. In a device for handling boats, a longitudinally extending beam projecting over the boat, securing means adjacent one extremity of said boat for detachably engaging said beam, an elongated resilient member depending from said beam at a point removed from said securing means, the end portions of said resilient member being engageable with said boat at spaced points for resiliently suspending said boat from said beam, and means for moving the ends of said resilient member toward and from each other to permit engagement and disengagement with said boat.

EARL WILLIAM OETH.

REFERENCES CITED

The following references are of record in the file of this patent:

UNITED STATES PATENTS

| Number | Name | Date |
| --- | --- | --- |
| 441,721 | Trumbore | Dec. 2, 1890 |
| 2,375,754 | Ballinger | May 15, 1945 |